July 17, 1923.
H. P. PETERSEN
VALVE DEVICE FOR DUPLEX PUMPS
Filed July 6, 1921
1,462,122
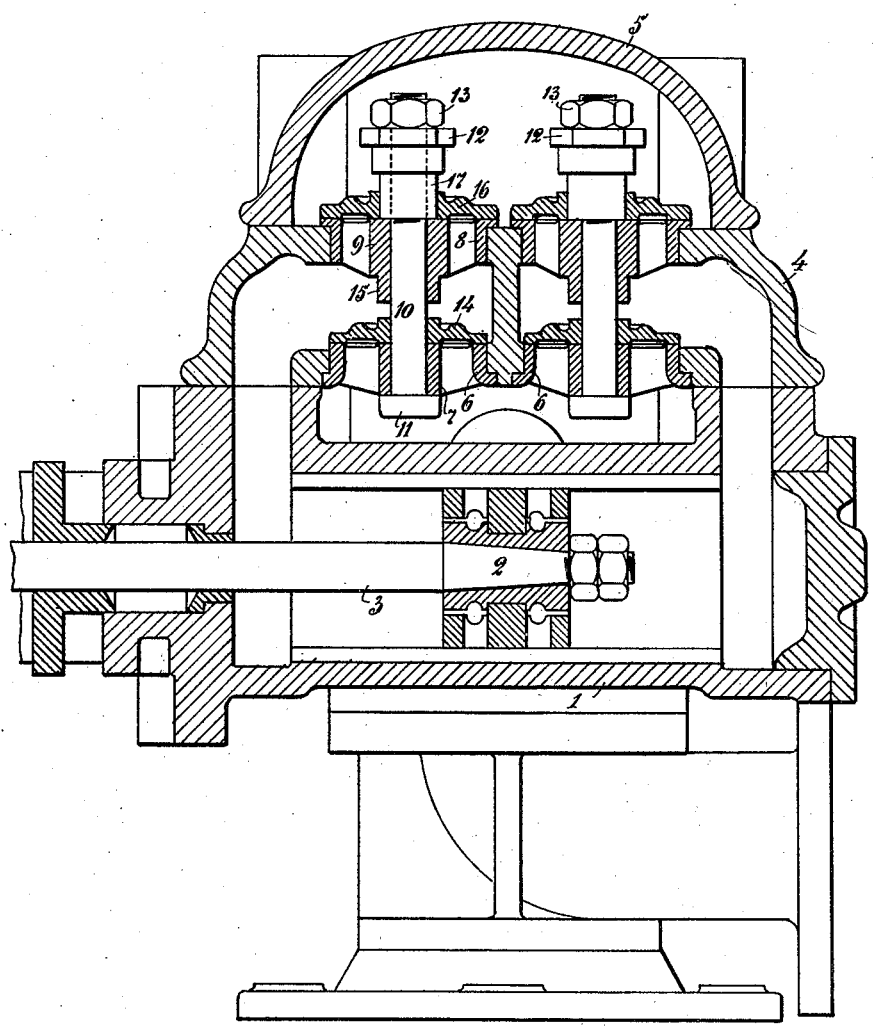
Inventor
H. P. Petersen,
By Marks & Clerk
Attys.

Patented July 17, 1923.

1,462,122

UNITED STATES PATENT OFFICE.

HANS PETER PETERSEN, OF COPENHAGEN, DENMARK, ASSIGNOR TO GLENT & HASSENKAMM LTD., OF COPENHAGEN, DENMARK, A CORPORATION OF DENMARK.

VALVE DEVICE FOR DUPLEX PUMPS.

Application filed July 6, 1921. Serial No. 482,844.

*To all whom it may concern:*

Be it known that I, HANS PETER PETERSEN, residing at Copenhagen, No. 17 Ny Carlsbergvej, Denmark, have invented certain new and useful Improvements in Valve Devices for Duplex Pumps (for which I have filed application in Denmark, May 4, 1918, Patent No. 23.956, dated December 21, 1918; in Norway, January 20, 1919, Patent No. 33,902, dated January 16, 1922; in Sweden, January 20, 1919, Patent No. 50,027, dated August 25, 1921; in Germany, February 1, 1919, Patent No. 316,185, dated November 22, 1919; and in Great Britain, filed January 8, 1921, Patent No. 157,154), of which the following is a specification.

The arrangement of the valves for pumps known as duplex pumps, especially feed pumps, often gives rise to inconveniences, the valve seats being difficult to apply, cumbersome to change and often becoming displaced.

The object of the present invention is to overcome these disadvantages, so that the valves and the valve seats are joined together in separate parts as described below.

The invention is shown in the drawings which shows a vertical longitudinal section through the one cylinder and valve of a duplex pump.

In the drawing 1 is the pump cylinder with a piston 2, piston rod 3, and valve box 4 with cover 5. The valve box and cover are secured by bolts screwed on to the pump cylinder.

In the valve box the four suction valves and the four delivery valves are fitted in the following manner:—

The seats of the suction valves consist of short cylindric collars 6, which by radial flanges are connected with a nave 7. In the same way the delivery valves consist of cylindric collars 8 which by flanges are connected with a nave 9. The suction valves are inserted from below in corresponding holes in the lower side of the valve box, and the delivery valves are inserted from above in corresponding holes in the upper side of the valve box, where after the corresponding suction and delivery valve seats are connected by a bolt 10 fitted with a head 11 and a nut 12 as well as a check nut 13. The suction valve 14 itself is displaceable on the bolt 10 and its upward movement is limited by an extension 15 on the nave 9. The delivery valve 16 is mounted to slide on an extension 17 of the nut 12.

It will now easily be seen that it will be exceedingly easy, by this means, to change valves and valve seats, it being possible after having removed the valve box, to unscrew the nuts 12 and 13, whereafter both valves with their corresponding seats can be removed.

Having now particularly described and ascertained the nature of my said invention and in what manner the same is to be performed, I declare that what I claim is:—

1. In combination, a valve box, superposed valve seats arranged in said box, opposed stop members carried by said seats and engaging portions of the box, adjustable securing means passing through the valve box and arranged to draw the stop members against the box whereby to clamp the seats in position, said seats being respectively removable from the top and bottom of the box, and valves associated with said seats.

2. In combination, a valve box, superposed valve seats mounted in said box, opposed stop members carried by said seats and engaging opposed portions of the box, adjustable securing means arranged to draw the stop members against the box whereby to clamp the seat in position, and valve slidably supported by the adjustable means and engageable with the seats.

3. In combination, a valve box, superposed valve seats arranged in said box, opposed stop members carried by said seats and engaging portions of the box, a bolt passing axially through said seats, a member adjustably mounted on said bolt operable to draw the stop members against the box whereby to clamp the seats in position, and valves associated with said seats.

4. In combination, a valve box, co-acting valve seats arranged in and respectively removable from the top and bottom of the box, valve seat securing means passing axially through the seats and simultaneously securing the latter in position, and valves associated with said seats.

5. In combination, a valve box, superposed valve seats mounted in said box, opposed stop members carried by the seats and engaging portions of the box, a headed bolt passing axially through the seats and having its headed extremity in abutment with one of said seats, a member adjustably fitted on the opposite extremity of the bolt bearing against the other seats and coacting with the head to draw said stop members against the valve box whereby to clamp the seats in position, an extension on said adjustable member, and valves associated with said seats, one of said valves being movably mounted directly on the bolt and the other valve being movably mounted on the extension of the adjustable member.

6. In combination, a valve box, superposed valve seats mounted in said box, opposed stop members carried by the seats and engaging portions of the box, a headed bolt passing axially through the seats and having its headed extremity in abutment with one of said seats, a member adjustably fitted on the opposite extremity of the bolt, bearing against the other seat and coacting with the head to draw said stop members against the valve box whereby to clamp the seats in position, an extension on said adjustable member, and valves associated with said seats, one of said valves being movably mounted directly on the bolt and the other valve being movably mounted on the extension of the adjustable member, and an extension on one of said seats constituting a stop for one of said valves, the movement of the other valve being limited by the adjustable member.

In testimony whereof I affix my signature in presence of two witnesses.

HANS PETER PETERSEN.

Witnesses:
　Chas. Urich,
　A. Christopfersen.